(12) United States Patent
Nakamura

(10) Patent No.: US 8,570,541 B2
(45) Date of Patent: Oct. 29, 2013

(54) IMAGE FORMING DEVICE AND POWER CONSUMPTION CONTROL METHOD IN AN IMAGE FORMING DEVICE

(75) Inventor: Yutaka Nakamura, Hidaka (JP)

(73) Assignees: Casio Electronics Manufacturing Co., Ltd., Tokyo (JP); Casio Computer Co., Ltd., Tokyo (JP)

( * ) Notice: Subject to any disclaimer, the term of this patent is extended or adjusted under 35 U.S.C. 154(b) by 562 days.

(21) Appl. No.: 12/845,043

(22) Filed: Jul. 28, 2010

(65) Prior Publication Data

US 2011/0026056 A1 Feb. 3, 2011

(30) Foreign Application Priority Data

Jul. 28, 2009 (JP) ................................. 2009-175292
Sep. 30, 2009 (JP) ................................. 2009-226678

(51) Int. Cl.
*G06F 1/32* (2006.01)
*G06F 3/12* (2006.01)
*G06F 15/12* (2006.01)
*H04N 1/50* (2006.01)
*H04N 1/00* (2006.01)
*H04N 1/23* (2006.01)
*G06K 15/12* (2006.01)

(52) U.S. Cl.
CPC .......... *G06F 3/1221* (2013.01); *H04N 1/00891* (2013.01); *H04N 1/233* (2013.01); *H04N 1/2369* (2013.01); *G06K 15/129* (2013.01)
USPC ........... 358/1.13; 358/501; 358/300; 713/320

(58) Field of Classification Search
USPC ............. 358/1.15, 1.13, 1.14, 1.1, 1.12, 1.16, 358/1.6, 1.9, 406, 474; 713/320, 323, 300, 713/2, 321, 310, 324, 340; 347/224, 10, 347/102, 6, 88, 9; 382/100; 700/295–297
See application file for complete search history.

(56) References Cited

U.S. PATENT DOCUMENTS 8,406,653 B2 * 3/2013 Okamoto ....................... 399/110
2008/0075498 A1 * 3/2008 Kojo ................................ 399/85

(Continued)

FOREIGN PATENT DOCUMENTS

CN 101154066 A 4/2008
JP 2001-005344 A 1/2001

(Continued)

OTHER PUBLICATIONS

English Machine Translation of JP 2004336417 A.*

(Continued)

*Primary Examiner* — Scott A Rogers
(74) *Attorney, Agent, or Firm* — Holtz, Holtz, Goodman & Chick, PC

(57) ABSTRACT

The present invention provides an image forming device that reduces power consumption by setting the color image recording units to low power consumption mode during monochrome image recording, and a power consumption control method in an image forming device. Furthermore, this image forming device has a monochrome image recording unit and color image recording units, and is an image forming device capable of setting the monochrome image recording unit and color image recording units to low power consumption mode, and has a switching unit for switching between monochrome image recording and color image recording, and a control unit that sets the color image recording units to low power consumption mode during monochrome image recording and continues to set the color image recording units to low power consumption mode while this monochrome image recording continues.

12 Claims, 12 Drawing Sheets

(56) References Cited

U.S. PATENT DOCUMENTS

2008/0304091 A1* 12/2008 Kobashigawa .............. 358/1.13
2009/0022511 A1* 1/2009 Kubo et al. ..................... 399/83

FOREIGN PATENT DOCUMENTS

| JP | 2003-156968 A | 5/2003 |
| JP | 2004-336417 A | 11/2004 |
| JP | 2006-171334 A | 6/2006 |
| JP | 2006-217075 A | 8/2006 |
| JP | 2007-010745 A | 1/2007 |
| JP | 2008-096912 A | 4/2008 |
| JP | 2008-216320 A | 9/2008 |
| JP | 2008-225047 A | 9/2008 |
| JP | 2008-225305 A | 9/2008 |
| JP | 2009-265430 A | 11/2009 |

OTHER PUBLICATIONS

Chinese Office Action dated Nov. 27, 2012 (and English translation thereof) in counterpart Chinese Application No. 201010270189.8.
Japanese Office Action dated Oct. 30, 2012 (and English translation thereof) in counterpart Japanese Application No. 2009-226678.
Japanese Office Action dated May 28, 2013 (and English translation thereof) in counterpart Japanese Application No. 2009-226678.

* cited by examiner

FIG. 10

| PRINTER DEVICE STATUS | CURRENT FLOWING TO ONE IMAGE EXPOSURE UNIT | TOTAL POWER CONSUMPTION IN COLOR MODE | TOTAL POWER CONSUMPTION IN MONOCHROME MODE |
|---|---|---|---|
| SLEEPING | 20mA | 0.8W | 0.8W |
| STANDBY | 300mA | 12W | 3.6W |
| PRINTING | 0.5A | 12.5W | 3.5W |

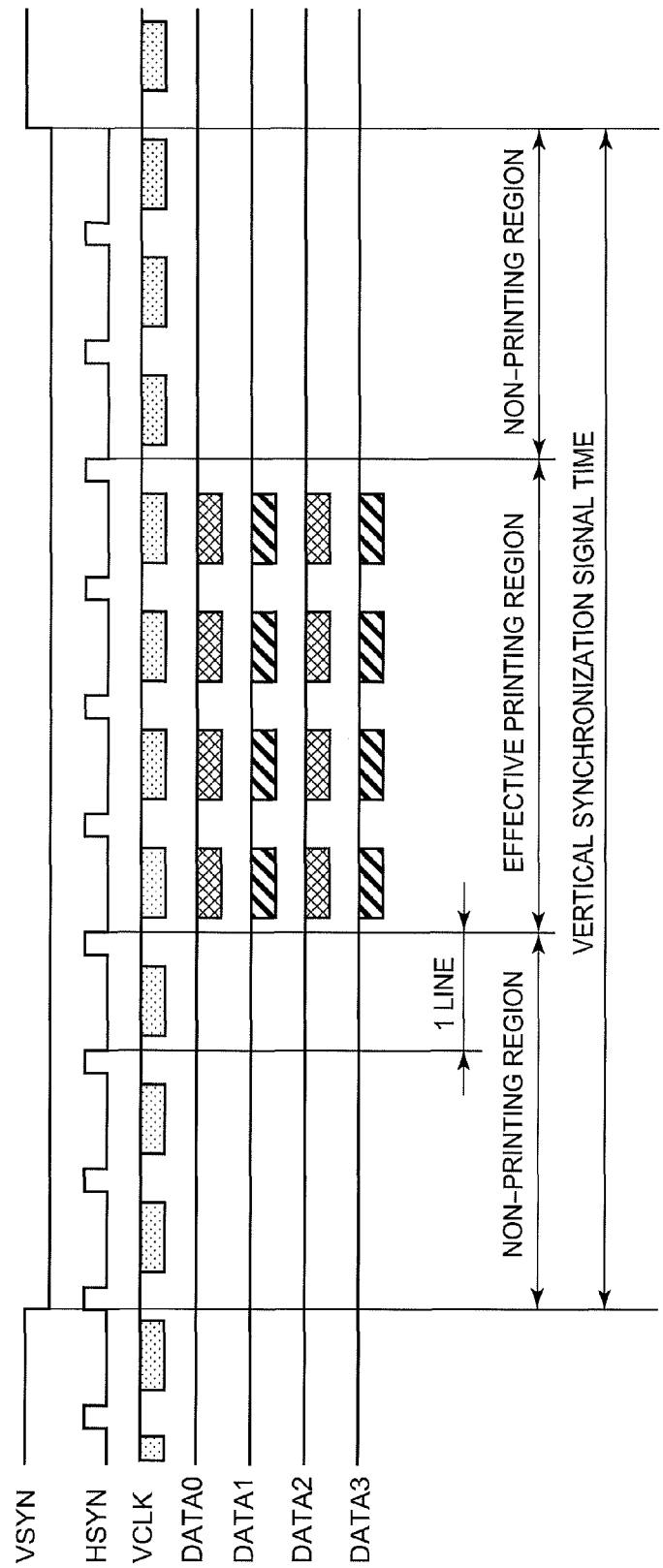

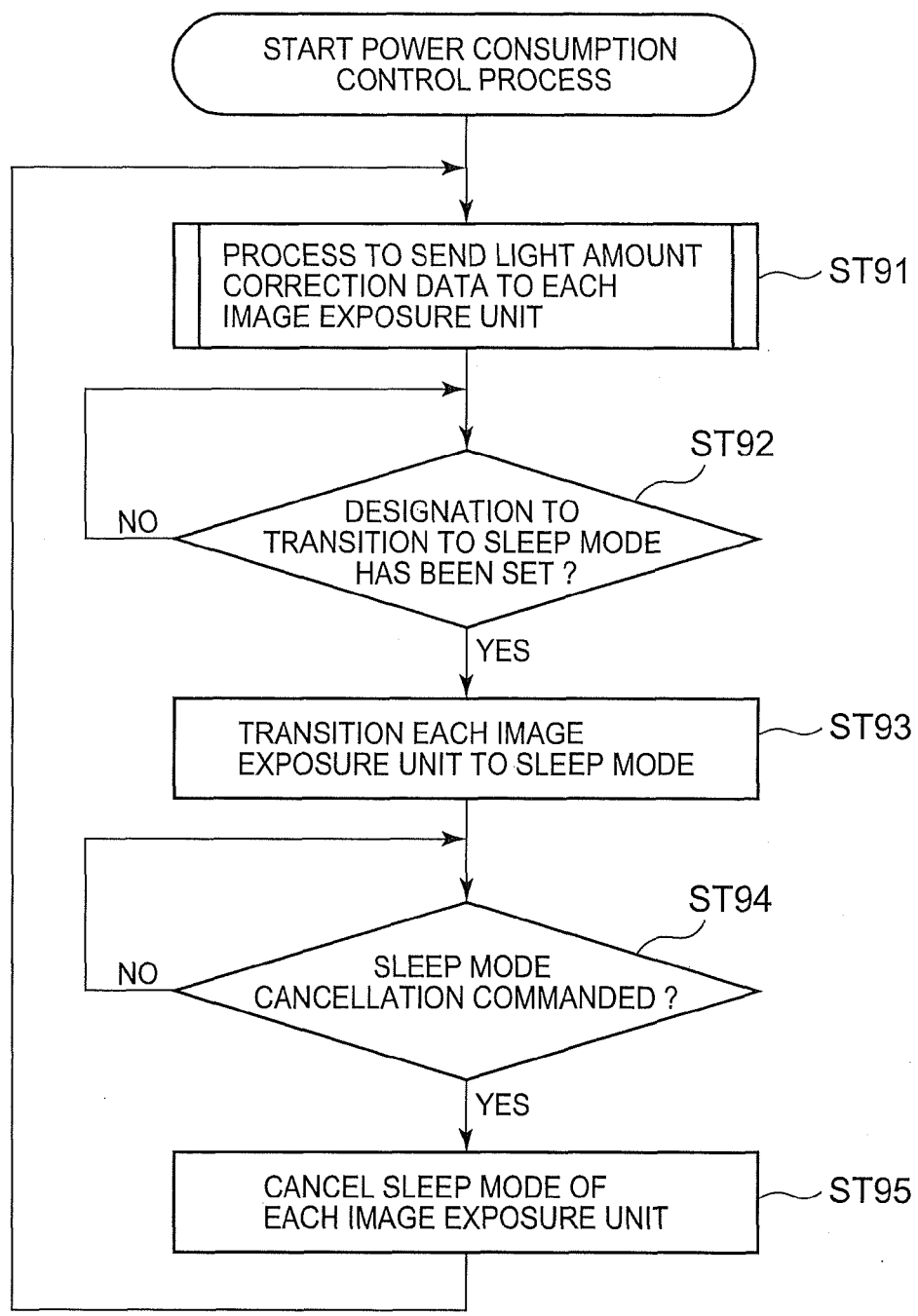

IMAGE FORMING DEVICE AND POWER CONSUMPTION CONTROL METHOD IN AN IMAGE FORMING DEVICE

CROSS-REFERENCE TO RELATED APPLICATION

This application claims the benefit of Japanese Patent Application No. 2009-175292 filed Jul. 28, 2009 and Japanese Patent Application No. 2009-226678 filed Sep. 30, 2009, the entire disclosure of which is incorporated by reference herein.

FIELD

This application relates generally to an image forming device that reduces power consumption, and a power consumption control method in an image forming device.

BACKGROUND

Today, preservation of the global environment is being called for worldwide, and restrictions on emissions of greenhouses gases are becoming realized, centered on global warming prevention conferences. In such circumstances, it is desirable to reduce power consumption in image forming devices such as printer equipment, copy machines and the like as well.

In the past, so-called sleep control processing has been accomplished wherein power consumption is reduced by turning off the fixing heater when no printing commands are received by the image forming device from host equipment or the like for a set time. Image forming devices have also been proposed which reduce power consumption by switching the image exposure unit, operation display unit and so forth to low power consumption mode.

FIG. 12 is a flowchart showing one example of a power consumption control process in the image exposure unit executed by an image forming device that can set the image exposure unit to a low power consumption mode (hereafter referred to as a sleep mode). First, when the device power is turned on, as a preparatory step to the image forming process action, the image forming device sends light amount correction data to the image exposure units for each color (step (hereafter abbreviated ST) 91). This is a process that sends light amount correction data used in correcting variances in the flash light amounts among LED elements in the image exposure units for each color. By executing this process, the image forming device sends preset light amount correction data to a certain area in memory contained in the circuits that control driving of each image exposure unit.

Next, the image forming device determines whether or not a designation to transition to the sleep mode (hereafter, the sleep mode action transition designation) has been set in the controller of the image forming device (ST92). Until the sleep mode action transition designation has been set, the image forming device maintains a standby mode in which the printing process is immediately possible (ST92; NO). This sleep mode action transition designation is set when a print command from the host equipment, for example, is not detected within a set time. When the image forming device determines that a sleep mode action transition designation has been set as described above in the memory unit of the controller (ST92; YES), the image exposure units for each color are transitioned to sleep mode (a control action state that consumes less power than other modes) (ST93). Following this, the image forming device determines whether or not an instruction has been received canceling the sleep mode action transition designation (hereafter, referred to simply as sleep mode cancellation) (ST94). When the determination is that no sleep mode cancellation has been received, the image forming device waits for sleep mode cancellation to be ordered (ST94; No). Because the power supply to the image exposure units for each color is restricted when the switch is made to sleep mode, the light amount correction data sent to each image exposure unit as described above is extinguished.

Sleep mode cancellation is performed when a print command (input of printing data) is received from the host equipment or the like. For that reason, the image forming device upon receiving a print command determines that sleep mode cancellation has been ordered (ST94; YES) and cancels the sleep mode of the image exposure units for each color (ST95). Following this, the image forming device again sends light amount correction data to the image exposure unit for each color in order to accomplish preparatory processes for the image forming action (ST91). Following that, the printing process is accomplished in accordance with the print command.

As discussed above, an image forming device has been proposed which accomplishes a power-saving control action by reducing the power supplied to the image exposure unit when no print command is input from the host equipment within a set time.

In addition, an example of an image forming device that can further reduce power consumption in the entirety of an image forming device capable of accomplishing a plurality of types of actions, such as copy mode, print mode and scanner mode, has been disclosed in Unexamined Japanese Patent Application KOKAI Publication No. 2006-217075. This image forming device selectively supplies power needed for reading documents and power needed for writing images only with the timing necessary for copy mode, print mode and scanner mode by detecting the insertion of a document, the passing of a document or the inputting of an outside control signal.

However, the above-described conventional method for reducing power consumption in image exposure units has the following problems. In other words, in monochrome mode (black-and-white recording action), only the image exposure unit for black (K) needs to operate, so the image exposure units for color could be set to sleep mode. However, when the image exposure units for color are switched to sleep mode, the light amount correction data recorded in volatile memory in the image exposure units is lost. For that reason, with the conventional method, when canceling the sleep mode the image forming device cannot restart color mode (color recording action) without again sending the light amount correction data to the image exposure units and again storing this in the memory the image exposure units possess. In addition, when a state with no print command from the host equipment continues, the switch time condition for transitioning to sleep mode is generally set short (for example, five to 10 minutes). For this reason, with the conventional method even when the print command data sent from the superior equipment is data for a printing process in monochrome mode, ultimately the setting of the image exposure units for color to sleep mode one by one is not accomplished.

However, despite the continuance of a status under which color printing cannot be conducted, such as print jobs ordering monochrome print processes being sent multiple consecutive times from the host equipment, wasted electric power is consumed because even the image exposure units for color (not in sleep mode) are maintained in an operable condition so as to be capable of promptly responding to print jobs.

In particular, these days, when global warming should be prevented and exhaust regulations on greenhouse gases are being realized, even a small reduction in power is important. Accordingly, controlling sleep mode by distinguishing between image exposure units for color printing and image exposure units for monochrome printing in response to the recording colors of printing data input from the host equipment cannot be ignored as an effect of power-reduction policies.

SUMMARY

The present invention was invented in consideration of the foregoing, and provides an image forming device can reduce power consumption by setting the color image recording units to low power consumption mode during monochrome image recoding, and a power consumption control method in an image forming device.

An aspect of the present invention provides an image forming device comprising a monochrome image recording unit for driving a monochrome image exposure unit on the basis of monochrome image data and accomplishing a recording process on a record medium, and a color image recording unit for driving a color image exposure unit on the basis of color image data and accomplishing a recording process on a record medium, such that said monochrome image recording unit and said color image recording unit can be set to a low power consumption mode, and further comprising:

a switching unit for switching between monochrome image recording and color image recording; and a control unit for setting the color image recording unit to the low power consumption mode when recording said monochrome images and continuing to set the color image recording unit to the low power consumption mode while the monochrome image recording continues.

In addition, a preferable aspect of the present invention provides the above-described image forming device, wherein light amount correction data is written to the image exposure unit of the monochrome image recording unit during monochrome image recording.

In addition, a preferable aspect of the present invention provides the above-described image forming device, wherein the light amount correction data is read out from a non-volatile memory provided in the monochrome image recording unit.

In addition, a preferable aspect of the present invention provides the above-described image forming device, wherein the light amount correction data is read out from a non-volatile memory provided in the image forming device.

In addition, a preferable aspect of the present invention provides the above-described image forming device, wherein the switching unit also controls a switching operation that displaces the conveyor path of an intermediate transfer belt that conveys a toner image between the color image recording time and the monochrome image recording time.

Furthermore, a second aspect of the present invention provides a power consumption control method in an image forming device having a monochrome image recording unit and a color image recording unit and being capable of setting said monochrome image recording unit and said color image recording unit to a low power consumption mode;

wherein said power consumption control method accomplishes:

a switching process that switches between monochrome image recording and color image recording; and, a control process that sets the color image recording unit to the low power consumption mode during the monochrome image recording and continues to set the color image recording unit to the low power consumption mode while the monochrome image recording continues.

Furthermore, a third aspect of the present invention provides an image forming device, being an image forming device provided with a plurality of image exposure units for recording images on the basis of image data corresponding to basic recording colors, accomplishing monochrome image recording through any one of these image exposure units and recording color images to a record medium by two or more of the image exposure units overlappingly recording images;

such that the image forming device is provided with:

a power supply unit for supplying an electrical power source to the image exposure units for basic recording colors; and, an image data identification unit for identifying image data corresponding to the various recording colors from image information input from host equipment;

wherein the power supply unit supplies power only to the image exposure units of colors necessary for recording images on the basis of an identification results of the identification unit, and does not supply power to or reduces power to the image exposure units of colors unnecessary for recording the image.

In addition, a preferable aspect of the present invention provides the above-described image forming device, wherein the basic recording colors are the basic colors based on subtractive mixture colors, namely yellow, magenta and cyan along with black, which is the monochrome recording color.

In addition, a preferable aspect of the present invention provides the above-described image forming device, wherein the image data identification unit identifies whether printing data input from the host equipment is recording data with only the monochrome recording color or recording data containing any of the basic colors based on the subtractive mixture colors.

In addition, a preferable aspect of the present invention provides the above-described image forming device, wherein the power supply unit supplies power only to the image exposure units of colors determined by the image data identification unit to be necessary for recording the printing data input from the host equipment.

In addition, a preferable aspect of the present invention provides the above-described image forming device, wherein the power supply unit supplies power only to the image exposure unit of the monochrome recording color when the image data identification unit has identified the input printing data as a recording data containing only the monochrome recording color, and supplies power to all of the image exposure units when the identification unit has identified the printing data input from the host equipment as a recording data containing any of the basic colors based on the subtractive mixture colors.

Furthermore, a fourth aspect of the present invention provides a power consumption control method in an image forming device provided with a plurality of image exposure units for recording images on the basis of image data corresponding to basic recording colors, accomplishing monochrome image recording through any one of these image exposure units and recording color images to a record medium by two or more of the image exposure units overlappingly recording images;

wherein said power consumption control method accomplishes:

a power supply process for supplying an electrical power source to the image exposure units for basic recording colors; and, an image data identification process for identifying image data corresponding to the various recording colors from image information input from host equipment;

wherein the power supply process supplies power only to the image exposure units of colors necessary for recording images on the basis of the identification results of the identification process, and does not supply power to or reduces power to the image exposure units of colors unnecessary for recording the image.

With the present invention, it is possible to reduce power consumption during image formation and during standby in monochrome mode by causing the image exposure units for color to transition to low power consumption mode when the image forming device is operating in monochrome mode. In addition, even when the image exposure units for color are in a sleep status and a command for color printing is input from the host equipment or the like, the image exposure units for color can be quickly restored from sleep mode status to a recordable status.

BRIEF DESCRIPTION OF THE DRAWINGS

A more complete understanding of this application can be obtained when the following detailed description is considered in conjunction with the following drawings, in which:

FIG. 10 is a drawing showing the amount of power consumed by color image recording and monochrome image recording in sleep mode, in standby mode and during printing;

FIG. 11 is a timing chart showing one example of the timing of transferring image data; and FIG. 12 is a flowchart showing one example of the power consumption control process in a conventional image exposure unit.

DETAILED DESCRIPTION

The preferred embodiments of the present invention are described below with reference to the drawings.

Figure 2:
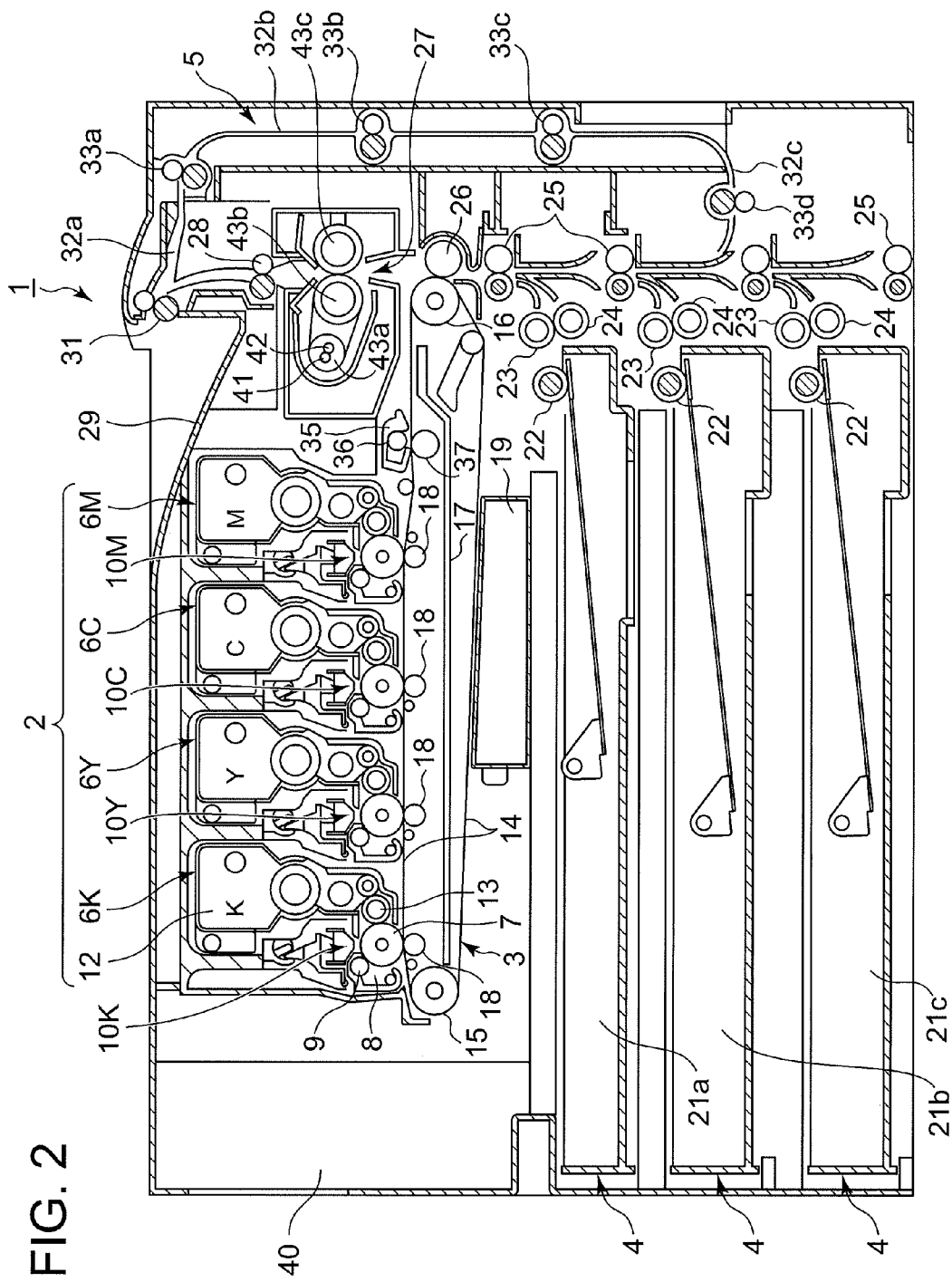
FIG. 2 is a cross-sectional view showing one example of the internal composition of a printer device according to this embodiment.

FIG. 2 is a cross-sectional view showing one example of the internal composition of the image forming device 1 (hereafter printer device 1) according to this embodiment.

The printer device 1 shown in this drawing is a color printer, and the printing methods of the printer device 1 are an electronic photograph method and a secondary transfer method. The printer device 1 is of the tandem type. The printer device 1 is composed of an image forming unit 2, an intermediate transfer belt unit 3, a paper supply unit 4 and a double-sided printing conveyor unit 5.

The image forming unit 2 is composed of four image forming units 6 (6M, 6C, 6Y and 6K) from right to left in the drawing, arranged in multiple stages. Of these four image forming units 6, the three image forming units 6M, 6C and 6Y on the upstream side (the right side in the drawing) form color images using magenta (M), cyan (C) and yellow (Y) color toner, respectively, these being the primary colors for subtractive mixture colors. In addition, of these four image forming units 6, the one image forming unit 6K on the downstream side (the left side in the drawing) forms monochrome images using black (K) toner. This black (K) toner is primarily used for text and dark areas in images.

The composition of the various image forming units 6 above is virtually the same, excluding the difference in the color of the toner stored in the toner cartridge. Accordingly, this composition is explained below using the black (K) image forming unit (6K) as an example.

The image forming unit 6 is provided at the very bottom with a photosensitive drum 7. The periphery of the photosensitive drum 7 is composed for example of organic light-conducting materials. Near the periphery of the photosensitive drum 7, a cleaner 8, a charging roller 9, an image exposure unit 10K (10M, 10C, 10Y) and a developing roller 13 in a developer 12 are positioned so as to surround the photosensitive drum 7.

The developer 12 stores toner in magenta (M), cyan (C), yellow (Y) and black (K) (hereafter in this drawing indicated by the symbols M, C, Y and K, respectively) in the above toner cartridges. In addition, in the central part of the developer 12, the developer 12 is provided with a toner replenishing mechanism for replenishing the toner from the toner cartridges below the developer 12. Furthermore, the developer 12 is provided with the above-described developing roller 13 in a side opening formed in the bottom of the developer 12. Still further, the developer 12 is provided, inside the developer 12, with a toner stifling member for stifling toner supplied by the toner replenishing mechanism, a toner supply roller for supplying stirred toner to the developing roller 13 and a doctor blade for controlling the toner layer supplied to the developing roller 13 to a constant thickness.

The intermediate transfer belt unit 3 is provided with an endless intermediate transfer belt 14 extending in a flat loop shape virtually from end to end in the left-right direction of the drawing virtually in the center of the device, and a drive roller 15 and a subordinate roller 16 over which this intermediate transfer belt 14 is looped and which cause the intermediate transfer belt 14 to move in a counterclockwise direction in the drawing.

The various toner images in the colors M, C, Y and K formed on the photosensitive drums 7M, 7C, 7Y and 7K, respectively, are directly transferred (primary transfer) to the belt surface of the intermediate transfer belt 14. Following this, the intermediate transfer belt 14 conveys the transferred toner images to the transfer position where the toner images are transferred (secondary transfer) to paper. The entire unit it referred to as the intermediate transfer belt unit.

This intermediate transfer belt unit 3 is provided with a belt position control mechanism 17 inside the loop of the intermediate transfer belt 14, which is in a flat loop shape. The belt position control mechanism 17 is provided with primary transfer rollers 18 composed of a conductive foam sponge that press the intermediate transfer belt 14 toward the lower perimeter surface of the photosensitive drums 7.

The belt position control mechanism 17 can displace the support shafts of the three primary transfer rollers 18 corresponding to the three image forming units 6M, 6C and 6Y for magenta (M), cyan (C) and yellow (Y) up or down all together. On the other hand, the belt position control mechanism 17 can displace the support shaft of the one primary transfer roller 18 corresponding to the image forming unit 6K for black (K) up or down independent of the support shafts of the three primary transfer rollers 18 above. In other words, in full color mode the belt position control mechanism 17 can cause the intermediate transfer belt 14 to contact the photosensitive drums 7 of the image forming units 6M, 6C, 6Y and 6K by raising the three primary transfer rollers 18 corresponding to the image forming units 6M, 6C and 6Y all together and raising the one primary transfer roller 18 corresponding to the image forming unit 6K. In addition, in monochrome mode, the belt position control mechanism 17 can lower the primary transfer rollers 18 corresponding to the image forming units 6M, 6C and 6Y in tandem and leave the primary transfer roller 18 corresponding to the image forming unit 6K raised, so that the intermediate transfer belt 14 remains in contact with the photosensitive drum 7 of the image forming unit 6K while separating this belt from the photosensitive drums 7 of each of the image forming units 6M, 6C and 6Y. By executing this control, the printer device 1 can switch the printing mode to full color mode (all four of the primary transfer rollers 18 abutting the intermediate transfer belt 14) or to monochrome mode (only the primary transfer roller 18 corresponding to the image forming unit 6K abutting the intermediate transfer belt 14).

In this intermediate transfer belt unit 3, a belt cleaner unit is positioned farther to the upstream side of the image forming unit 6M, which is on the most upstream side in the belt movement direction on the top surface. In addition, a thin used toner recovery container 19 is removably positioned horizontally in the intermediate transfer belt unit 3 so as to lie along virtually the entire bottom surface.

The paper supply unit 4 is provided with three paper supply cassettes 21A to 21C arranged in three levels top to bottom. Near the paper supply opening (to the right in the drawing) of each of the three paper supply cassettes 21A to 21C, a paper feed roller 22, a supply roller 23, an output roller 24 and a pair of standby conveyor rollers 25 are arranged. A secondary transfer roller 26 that presses against the subordinate roller 16 via the intermediate transfer belt 14 is provided in the paper conveyer direction (the vertical upward direction in the drawing) of the standby conveyor roller pair 25. This secondary transfer roller 26 constitutes the secondary transfer unit that transfers the toner image to the paper.

In addition, differing recording media are stored in each of the three paper supply cassettes 21A to 21C. For example, regular paper is stored in the paper supply cassette 21A, thick paper is stored in the paper supply cassette 21B and OHP paper is stored in the paper supply cassette 21C. Furthermore, corresponding paper is conveyed from the designated paper supply cassette 21A to 21C in accordance with the control described below.

A belt-type thermal fixing device 27 is positioned on the downstream side (upward in the drawing) of the above-described secondary transfer unit. A conveyor roller pair 28 that conveys from the belt-type thermal fixing device 27 paper to which the toner image has been fixed by the belt-type thermal fixing device 27, and a paper discharge roller pair 31 which discharges this conveyed paper into the paper discharge tray 29 formed on the top surface of the printer device 1 are provided further to the downstream side of the belt-type thermal fixing device 27. In addition, two heaters 41 and 42 are provided in the belt-type thermal fixing device 27.

The double-sided printing conveyor unit 5 is provided with a start reversal path 32A that branches in the right sideways direction in the drawing from the conveyance path between the conveyor roller pair 28 and the discharge roller pair 31, an intermediate reversal path 32B that arcs downward from there, a final edge reversal path 32C that finally reverses the reverse-conveyed paper by bending such in the left sideways direction opposite the above description, and four reversal roller pairs 33A, 33B, 33C and 33D positioned along this reversal path. The exit from the final edge reversal path 32C connects to the conveyance path to the standby conveyor roller pair 25 corresponding to the lower paper supply cassette 21 of the paper supply unit 4.

In addition, in this embodiment a cleaning unit 35 and a capture roller 36 are positioned on the top surface of the intermediate transfer belt unit 3. The cleaning unit 35 rubs off and removes used toner that comes into contact with the top surface of the intermediate transfer belt 14. The capture roller 36 takes the used toner removed by the cleaning unit 35 and deposits this in an unrepresented temporary storage unit in the belt cleaner unit. Following this, the capture roller 36 conveys this deposited used toner to the top of a drop cylinder through a conveyor screw, and recovers the used toner conveyed by the drop cylinder in the used toner recovery container 19.

In addition, in order to cause the above-described cleaning unit 35 to abut the intermediate transfer belt 14 with an appropriate pressure, a pressure roller 37 is provided to the side of the intermediate transfer belt unit 3 to press the intermediate transfer belt 14 from below toward the cleaning unit 35.

Figure 1:
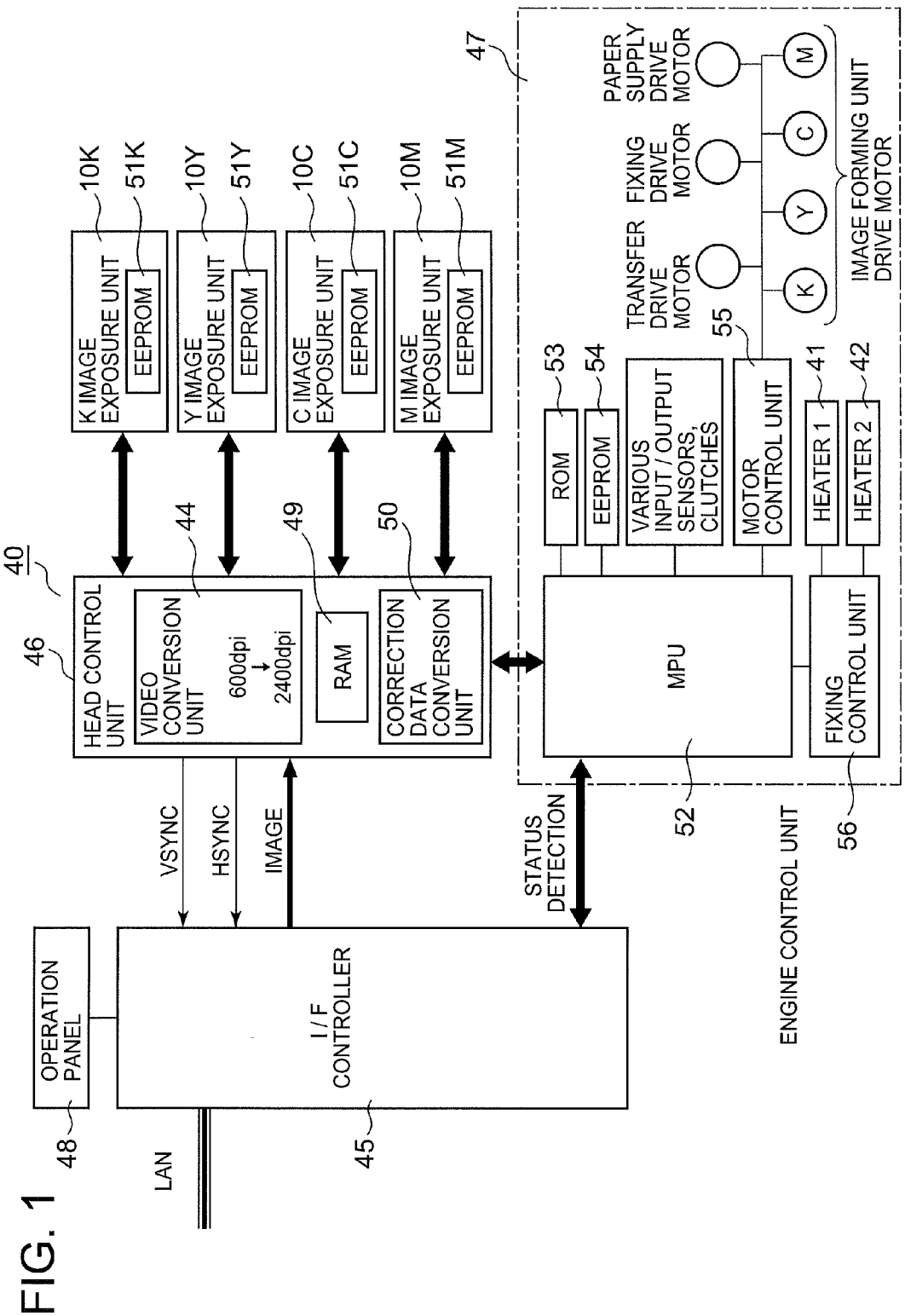
FIG. 1 is a composition drawing showing one example of the circuit composition of a printer device according to this embodiment.

In addition, data such as the number of rotations of the motor that causes the above-described rollers to rotate, the driving time of the heaters 41 and 42, the wait time of the printer device 1, the sleep time and so forth are recorded in a control unit 40 of the printer device 1 shown in FIG. 1.

FIG. 1 is a drawing showing one example of the circuit composition of the control unit 40 and the above-described image exposure units (10M, 10C, 10Y and 10K) possessed by the printer device having the above composition. The control unit 40 has an interface controller (hereafter called the I/F controller) 45, a head control unit 46 and an engine control unit 47, and an operation panel 48 is provided in the I/F controller 45.

The I/F controller 45 performs command analysis on printing data supplied from host equipment such as a personal computer (PC) via a LAN (local area network), and converts the analyzed print data into image data. Furthermore, the I/F controller 45 sends the image data to the head control unit 46 in accordance with a vertical synchronization signal (VSYNC) and a horizontal synchronization signal (HSYNC) from the head control unit 46.

The head control unit 46 is composed of a video conversion unit 44, RAM 49 and a correction data conversion unit 50. The video conversion unit 44 converts the resolution of the transferred image data for example from 600 DPI (dots per inch) to 2400 DPI. Following this, the head control unit 46 creates image data corresponding to the various recording colors from the converted image data, and supplies the created image data to the image exposure units 10M, 10C, 10Y and 10K corresponding to the various recording colors. In addition, EEPROMs (Electrically Erasable and Programmable Read Only Memory) 51M, 51C, 51Y and 51K are provided in the image exposure units 10M, 10C, 10Y and 10K, respectively. The EEPROMs 51M, 51C, 51Y and 51K record light amount correction data used in correcting the light amount of the individual light-emitting elements in the image exposure units 10M, 10C, 10Y and 10K corresponding to each. The image exposure units 10M, 10C and 10Y are primarily used to record color images, so the portion comprising the image exposure units 10M, 10C and 10Y, the head control unit 46 that controls these, and the transfer belt unit 3 that transfers the tone image formed on the photosensitive drums 7 through these is called the color image recording unit. In addition, the image exposure unit 10K is primarily used in recording monochrome images, so the portion comprising the image exposure unit 10K, the head control unit 46 and the transfer belt unit 3 is called the monochrome image recording unit. In addition, the image exposure units 10M, 10C, 10Y and 10K are supplied with electric power from a power box, for example. When the image exposure units 10M, 10C, 10Y and 10K have respectively transitioned to the low power consumption mode, power consumption by the image exposure units 10M, 10C, 10Y and 10K decreases compared to when such is not the case, so the power supply box supplies less electric power to the image exposure units 10M, 10C, 10Y and 10K than when such is not the case.

The engine control unit 47 is composed of an MPU 52, a ROM 53, an EERPOM 54, a motor control unit 55, a fixing control unit 56 and various input and output sensors and clutches. The motor control unit 55 accomplishes rotational driving control for the above-described image forming unit 6 (6M, 6C, 6Y and 6K), the intermediate transfer belt unit 3, the paper supply unit 4 and the thermal fixing device 27. In addition, the MPU 52 accomplishes control on the above-described various parts in accordance with programs stored in the ROM 53. The EEPROM 54 stores data on the number of printed pages, for example. In addition, the fixing control unit 56 controls heating of the above-described heaters 41 and 42.

Figure 3:
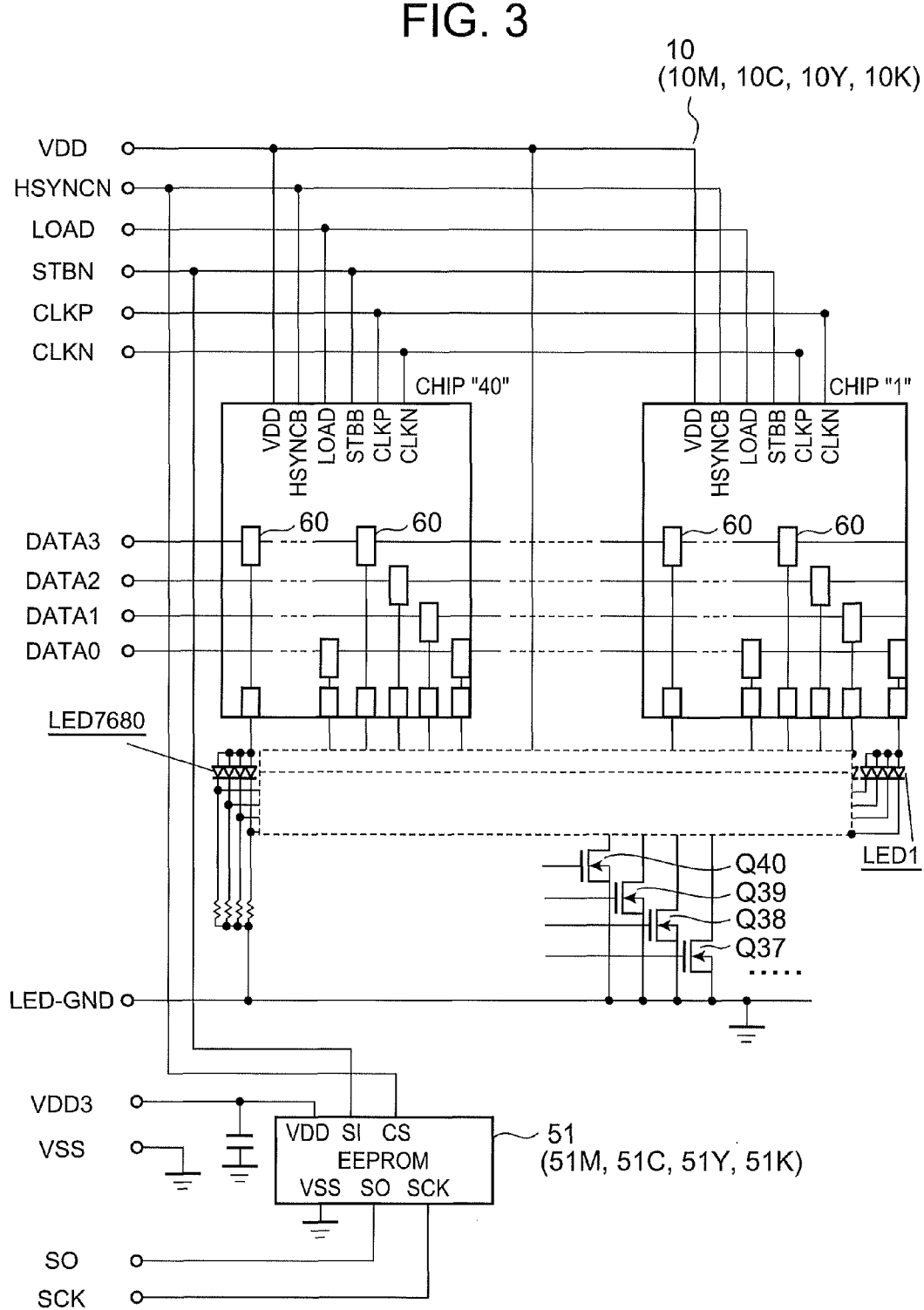
FIG. 3 is a circuit diagram showing one example of the composition of an image exposure unit.

FIG. 3 is a circuit diagram showing one example of the concrete composition of the image exposure units 10M, 10C, 10Y and 10K shows in FIG. 1. The composition of these image exposure units 10M, 10C, 10Y and 10K is basically the same, so the explanation below will refer to an image exposure unit 10 that represents the image exposure units 10M, 10C, 10Y and 10K.

As shown in this figure, 7,680 LEDs, labeled LED1 to LED7680, for example, are positioned in the image exposure unit 10, and the 7,680 LED elements light up in accordance with signals from chips 1 to 40. For example, chip 1 accomplishes lighting control of the 192 (48×4) LEDs LED1 to LED192, chip 2 accomplishes lighting control of the LED193 to LED384, and so forth with each chip accomplishing successive lighting control for 192 LEDs, and finally chip 40 accomplishes lighting control of LED7488 to LED7680.

In addition, in each chip a light amount correction value setting unit 60 is provided for setting the light amount correction value, which differs for each LED device. The light amount correction data stored in this light amount correction value setting unit 60 is stored in advance in the above-described EEPROMs 51M, 51C, 51Y and 51K and is written to the above-described light amount correction value setting unit 60 through the below-described process.

In addition, an electric voltage (VDD) is supplied to each chip 1 to 40, and the image data (DATA0 to DATA3) is supplied. In addition, "HSYNCN" is an input terminal for the horizontal synchronization signal (HSYNC), "LOAD" is an input terminal for the load signal, "STBN" is an input terminal for the strobe signal (and the address signal) and "CLKP" and "CLKN" are input terminals for the clock difference signal.

In addition, the current flowing to the LED elements of the chips 1 to 40 flows to LED-GND via transistors Q1 to Q40 corresponding to the LED elements.

The light amount correction data written to the light amount correction value setting unit 60 is stored in the EEPROMs 51M, 51C, 51Y and 51K (the explanation below will refer to an EEPROM 51 that represents the EEPROMs 51M, 51C, 51Y and 51K). In addition, the light amount correction data is set in the above-described light amount correction value setting unit 60 with the timing of introducing power to the printer device 1 or accomplishing cancellation of the sleep mode. A voltage (VDD3) is supplied to this EEPROM 51. A strobe signal (and address signal) is input to the "SI" terminal of the EEPROM 51, and the above-described horizontal synchronization signal (HSYNC) is input to the "CS" terminal of the EEPROM 51. In addition, the EEPROM 51 outputs the recorded light amount correction data to the RAM 49 of the above-described head control unit 46 from the "SO" terminal in synchronous with the clock signal input via the "SCK" terminal. The EEPROM 51 is grounded via a "VSS" terminal.

One example of the process action of the printer device 1 according to the present embodiment is described below.

Figure 4:
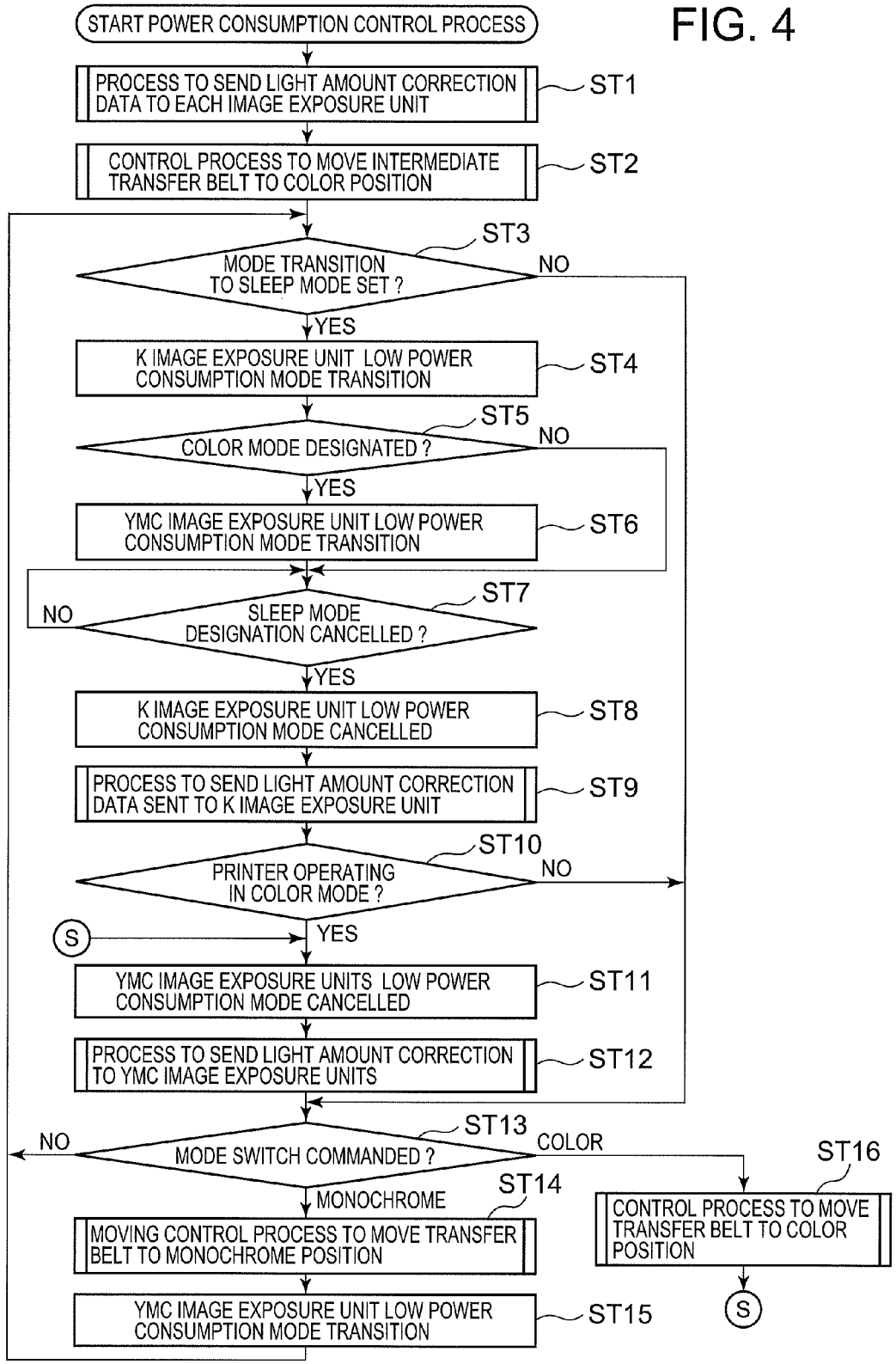
FIG. 4 is a flowchart showing one example of the power consumption control process executed by the image forming device of the present embodiment.

FIG. 4 is a flowchart showing one example of the power consumption control process executed by the printer device 1 of the present embodiment. First, when the power is introduced to the printer device 1, the head control unit 46 accomplishes the transfer process for the light amount correction data stored in the image exposure units 10M, 10C, 10Y and 10K (ST1).

Figure 5:
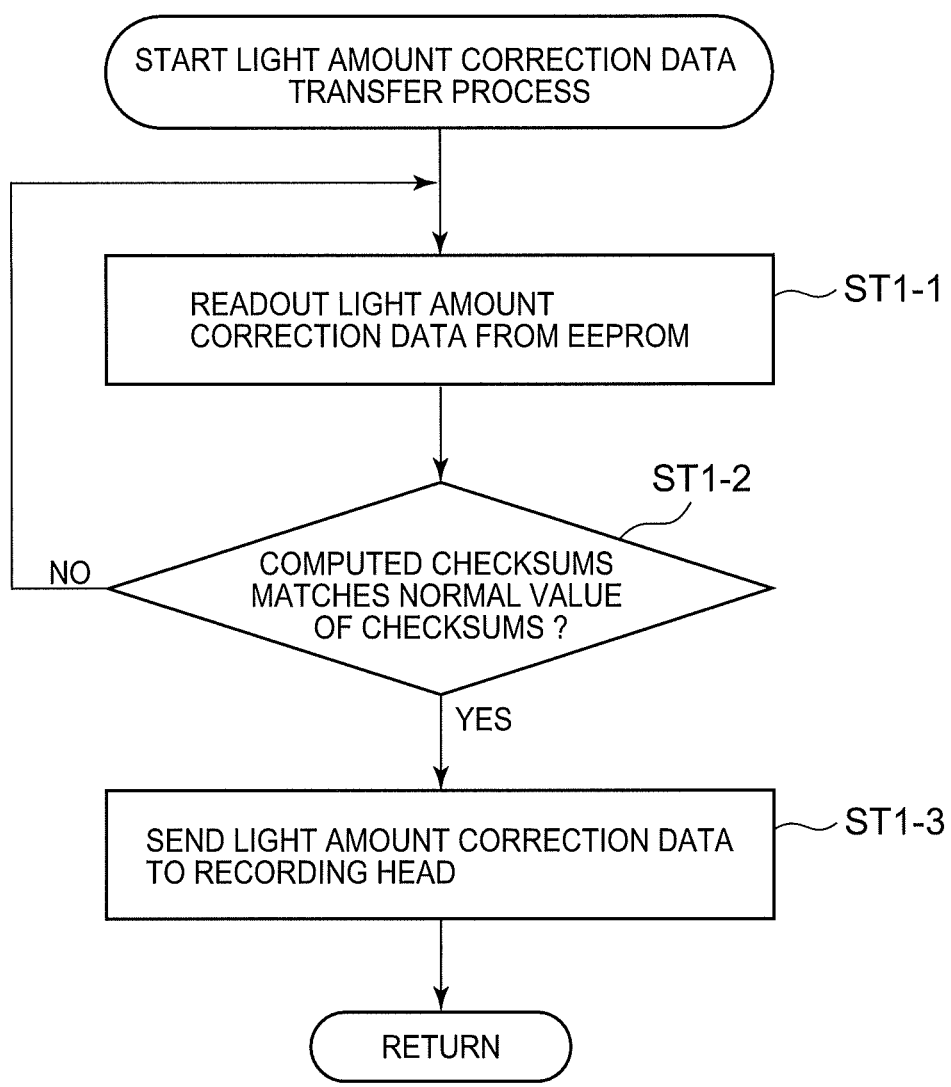
FIG. 5 is a flowchart showing one example of the light amount correction data transfer process.

FIG. 5 is a flowchart showing one example of this light amount correction data transfer process. First, the head control unit accomplishes a light amount correction data readout process (ST1-1). As described above, the light amount correction data is recorded in the EEPROMs 51M, 51C, 51Y and 51K, of the image exposure units 10M, 10C, 10Y and 10K and the head control unit 46 reads out the light correction data from the EEPROMs 51M, 51C, 51Y and 51K corresponding to the image exposure units 10M, 10C, 10Y and 10K.

Figure 6:
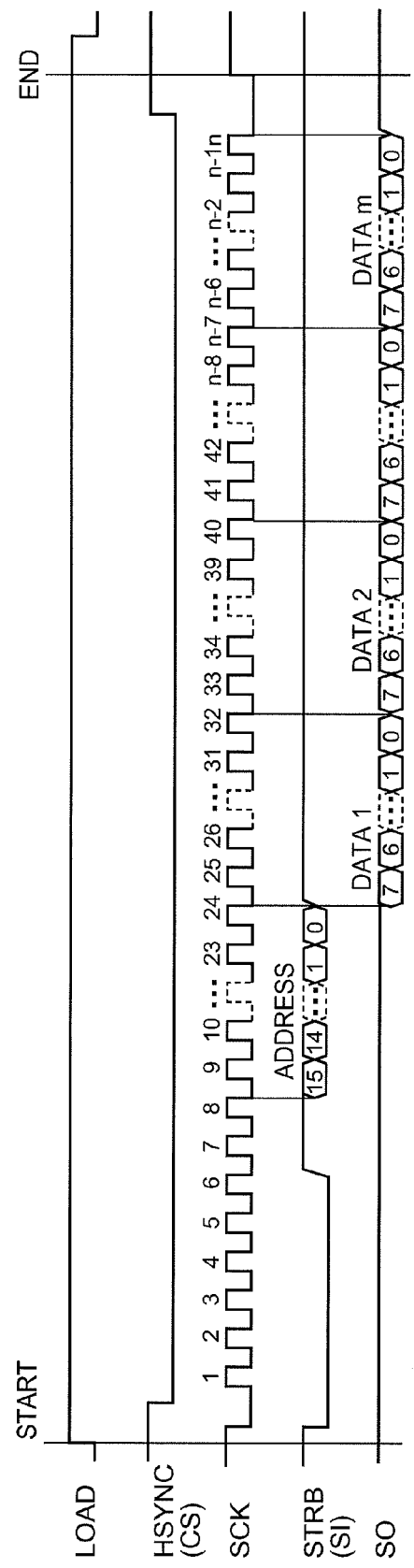
FIG. 6 is a timing chart showing one example of the timing of reading light amount correction data from EEPROM.

Specifically, as shown in the timing chart of FIG. 6, the head control unit 46 outputs the horizontal synchronization signal (HSYNC) to the "CS" terminal of each of the EEPROMs 51M, 51C, 51Y and 51K and supplies an address signal to the "SI" terminal while the load signal is being output to the EEPROMs 51M, 51C, 51Y and 51K. Following this, the head control unit 46 reads out the light amount correction data recorded at the address indicated by the supplied address signal from the "SO" terminals of the EEPROMs 51M, 51C, 51Y and 51K, and stores this read-out light amount correction data in the RAM 49. Furthermore, the head control unit 46 computes a checksum for each of the light amount correction data, and determines whether or not the computed checksums matches the normal value of the checksums (ST1-2 in FIG. 5). In addition, when it is determined that the checksum does not match the normal value (ST1-2; NO), the head control unit 46 returns to the light amount correction data readout process and again accomplishes this readout.

On the other hand, when it is determined that the checksum matches the normal value (ST1-2; YES), the head control unit 46 transfers the light amount correction data from each RAM 49 to the light amount correction value setting unit 60 of the image exposure units 10 (ST1-3). In other words, the light amount correction data for magenta (M) is transferred to the light amount correction value setting unit 60 of the image exposure unit 10M, the light amount correction data for cyan (C) is transferred to the light amount correction value setting unit 60 of the image exposure unit 10C, the light amount correction data for yellow (Y) is transferred to the light amount correction value setting unit 60 of the image exposure unit 10Y and the light amount correction data for black (K) is transferred to the light amount correction value setting unit 60 of the image exposure unit 10K. Following this, the head control unit 46 ends execution of the light amount correction data transfer process.

Figure 7:
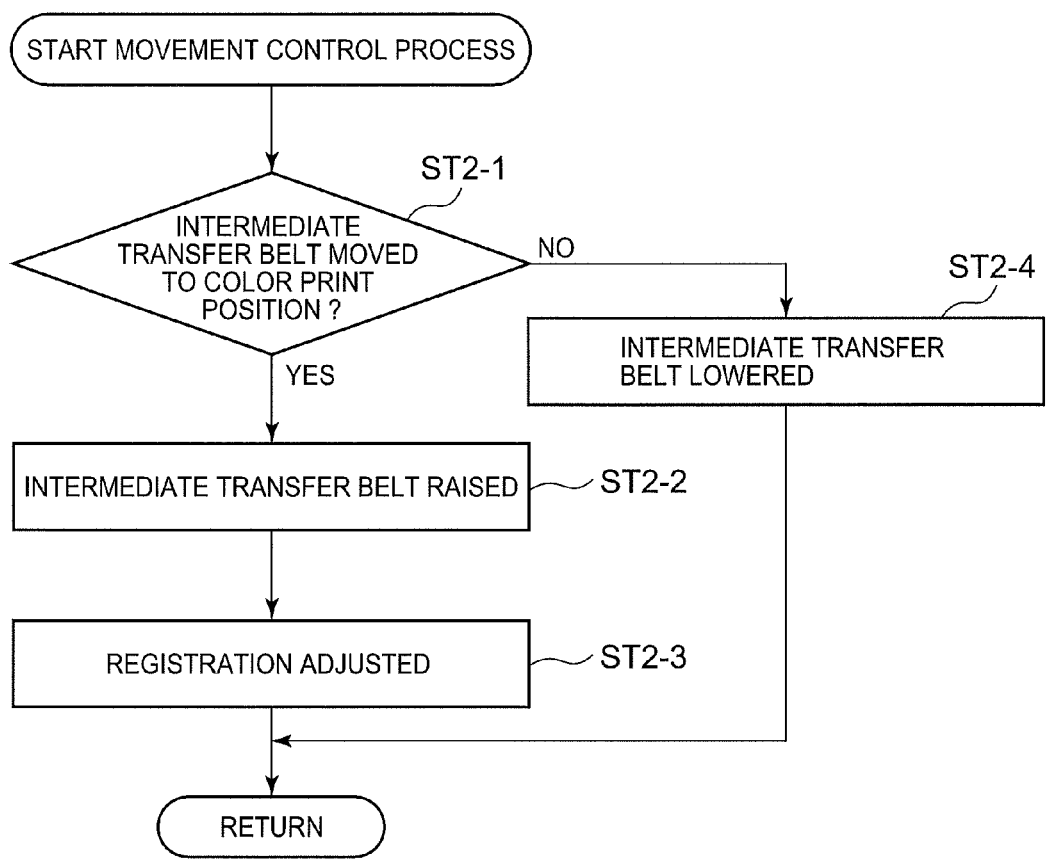
FIG. 7 is a flowchart showing one example of the movement control process for the intermediate transfer belt.

Next, the MPU 52 of FIG. 1 executes a movement control process on the belt position control mechanism 17 in order to move the conveyor path of the intermediate transfer belt 14 to a position (hereafter called the color printing position) abutting the photosensitive drums 7 of the image forming units 6C, 6M, 6Y and 6K (ST2 in FIG. 4). FIG. 7 is a flowchart showing one example of the movement control process for the intermediate transfer belt 14. First, the MPU 52 determines whether or not the situation is one in which the intermediate transfer belt 14 is to be moved to the color printing position (ST2-1). When it is determined that the situation is one in which the intermediate transfer belt 14 is to be moved to the color printing position (ST2-1; YES), the MPU 52 raises the intermediate transfer belt 14 by causing the primary transfer rollers 18 to displace (ST2-2). Next, the MPU 52 adjusts registration with respect to the image forming units 6C, 6M, 6Y and 6K after the image forming units 6C, 6M, 6Y and 6K are switched to a state in which the toner image can be transferred from the photosensitive drums 7 to the intermediate transfer belt 14 (ST2-3). In other words, in order to cause the intermediate transfer belt 14 to rise, the MPU 52 causes the all four of the primary transfer rollers 18 for magenta (M), cyan (C), yellow (Y) and black (K) to move to a position abutting the photosensitive drums 7 via the intermediate transfer belt 14. Through this, the image forming units 6C, 6M, 6Y and 6K achieve a state in which transferring of the color image is possible. Following this, the MPU 52, after causing positioning adjustment patch images to be formed by the image exposure units corresponding to the image forming units 6C, 6M, 6Y and 6K, causing these formed images to be transferred on the intermediate transfer belt 14. Through this, the MPU 52 accomplishes a registration adjustment process that undertakes positioning for forming color images by overlapping toner images using all colors of toner. The image forming units 6C, 6M, 6Y and 6K need several seconds of time for these processes.

Figure 8:
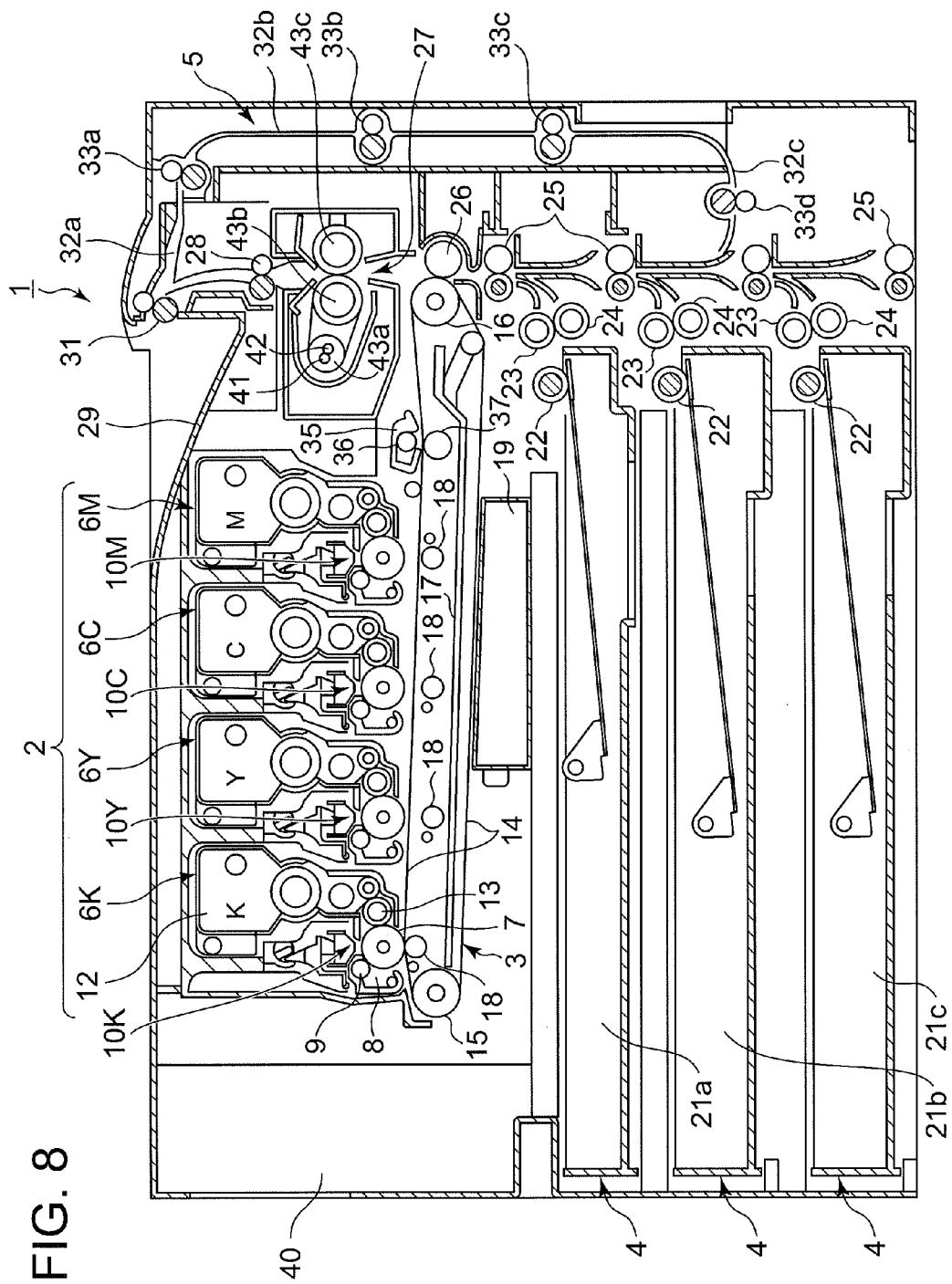
FIG. 8 is a cross-sectional view of a printer device showing one example of the conveyor path position of the intermediate transfer belt in monochrome mode.

When it is determined that the situation is not one in which the intermediate transfer belt 14 is to be moved to the color printing position (in other words, in the case of recording a monochrome image) (ST2-1; NO), the MPU 52 lowers the intermediate transfer belt 14 by setting the primary transfer rollers 18 corresponding to the image forming units 6C, 6M and 6Y to a position separated from the photosensitive drums 7 that the image forming units 6C, 6M and 6Y each possess, and setting the position of only the primary transfer roller 18 corresponding to the image forming unit 6K to a position abutting the photosensitive drum 7 corresponding to the image forming unit 6K via the intermediate transfer belt 14 (ST2-4). Following this, the MPU 52 ends execution of the movement control process for the intermediate transfer belt 14. FIG. 2 is a drawing showing the conveyor path position of the intermediate transfer belt 14 in color mode and FIG. 8 is a drawing showing the conveyor path position of the intermediate transfer belt 14 in monochrome mode.

Next, as shown in FIG. 4, the head control unit 46 determines whether or not the sleep mode action transition designation has been set in the RAM 49 (ST3). This sleep mode action transition designation is set for example when no print command is received from the host equipment or the like within a set time. When it is determined that the sleep mode action transition designation has been set (ST3; YES), the head control unit causes the image exposure unit 10K for black (K) to transition to sleep mode (low power consumption mode) (ST4).

Figure 9:
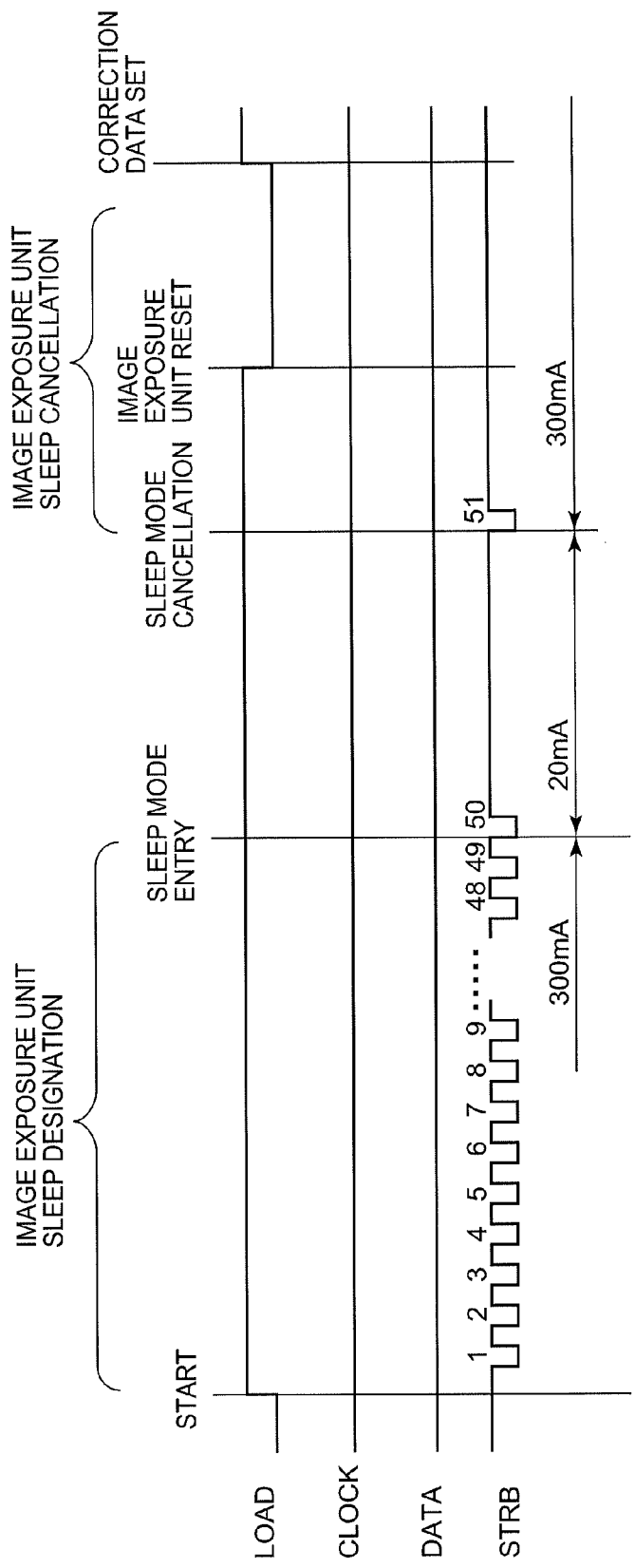
FIG. 9 is a timing chart showing one example of the timing of transitioning to sleep mode and one example of canceling sleep mode.

FIG. 9 is a timing chart showing one example of the timing of transitioning to sleep mode. The head control unit 46 outputs a strobe signal 50 times to the image exposure unit 10K when the load signal is being output. The head control unit 46 sets the image exposure unit 10K for black (K) to sleep mode with the timing of completing the 50 outputs of this strobe signal.

Next, the head control unit 46 determines whether or not color mode has been designated (ST5 in FIG. 4). When the head control unit 46 determines that color mode has not been designated (ST5; NO), the printer device 1 is in a state for accomplishing image recording in monochrome mode and this state is maintained until it is determined that there is a sleep mode cancellation order from the host equipment or the like (ST7; Yes).

The transition control to transition the color image exposure units (in other words, the image exposure units 10M, 10C and 10Y) to sleep mode is performed when, for example, a color print command is not given for at least 30 consecutive minutes. After the color image exposure unit has transitioned to sleep mode, when the monochrome image print process alone is repeated, this state continues for 60 minutes, 90 minutes, 120 minutes and so forth.

FIG. 10 is a drawing showing a comparison example of power consumption when the printer device 1 is accomplishing monochrome image recording and power consumption when the printer device 1 is accomplishing color image recording. FIG. 10 shows the electric current flowing to a single image exposure unit, power consumption during color image recording (in other words, during color mode) and power consumption during monochrome image recording (in other words, during monochrome mode) for each of the cases where the status of the printer device 1 is in sleep mode, in standby mode and printing.

For example, while the printer device 1 is in sleep mode (hereafter, when sleeping), all four of the image exposure units are controlled so as to be in a power-saving control state (in other words, in low power consumption mode or in sleep mode). When the printer device 1 is sleeping, the power source efficiency is 0.5, 20 mA of electric current flows to a single image exposure unit in a power-saving control state, and 5V of voltage is impressed, so the power consumed by a single image exposure unit in a power-saving control state can be calculated using the following equation (1) to be 0.2 W.

$$\text{Power consumed by a single image exposure unit in a power-saving control state} = 5\text{ V} \times 20\text{ mA}/0.5 = 0.2\text{ W} \quad (1)$$

If the status of the printer device 1 is sleep mode, the image exposure units 10M, 10C, 10Y and 10K of all four colors are controlled so as to be in the power-saving control state, so whether during color image recording or during monochrome image recording, the total power consumed by the image exposure units of the four colors is no different and is 0.8 W.

While the status of the printer device 1 is a standby status waiting for a print command from the host equipment or the like (hereafter referred to as in standby), the four image exposure units are divided into those controlled so as to be in a standby state and those maintained in the power-saving control state (in other words, sleep status). While the printer device 1 is in standby, the power source efficiency is 0.5, the electric current flowing to a single image exposure unit in standby is 300 mA and a 5V electric voltage is impressed, so the power consumed by a single image exposure unit in standby can be calculated from the following equation (2) to be 3 W.

$$\text{Power consumed by a single image exposure unit in standby} = 5\text{ V} \times 300\text{ mA}/0.5 = 3\text{ W} \quad (2)$$

If the status of the printer device 1 is standby, during color image recording image exposure units of the four colors are also maintained in standby, so the total power consumption of the image exposure units for the four colors is 12 W (3 W×4). On the other hand, during monochrome image recording, only the image exposure unit 10K for black is maintained in standby status and the image exposure units 10M, 10C and 10Y for the remaining three colors are maintained in sleep status. Consequently, 300 mA of electric current flows to the image exposure unit 10K for black, which thus consumes 3 W of power, but only 20 mA of electric current flows to each of the image exposure units 10M, 10C and 10Y, which thus consume only 0.2 W of power each. Hence, during monochrome image recording by the printer device 1 in standby status, the total power consumed by the four image exposure units is 3.6 W (3 W+0.2 W×3), so 8.4 W (12 W−3.6 W) of power can be saved compared to the color mode.

Similarly, while the status of the printer device 1 is a print status for printing images (hereafter referred to as printing), the image exposure units are divided into those controlled so as to be in print status and those controlled so as to be in power-saving control status (in other words, sleep status). When the printer device 1 is printing, the power source efficiency is 0.8, 500 mA of electric current flows to a single image exposure unit in print status and 5 V of voltage is impressed, so the power consumed by a single image exposure unit in print status can be calculated from the following equation (3) to be 3.125 W.

$$\text{the power consumed by a single image exposure unit in print status} = 5\text{ V} \times 500\text{ mA}/0.8 = 3.125\text{ W} \quad (3)$$

Because 20 mA of electric current flows to a single image exposure unit in sleep status and 5 V of voltage is impressed (with a power source efficiency of 0.8), the power consumed by a single image exposure unit in sleep status can be calculated from the following equation (4) to be 0.125 W.

$$\text{Power consumed by a single image exposure unit in sleep status} = 5\text{ V} \times 20\text{ mA}/0.8 = 0.125\text{ W} \quad (4)$$

If the status of the printer device 1 is print status, during color image recording the image exposure units for all four colors are maintained in print status, so the total power consumption by the image exposure units for the four colors is 12.5 W (3.125 W×4). On the other hand, during monochrome image recording, only the image exposure unit 10K for black is maintained in print status and the image exposure units 10M, 10C and 10Y for the remaining three colors are maintained in sleep status. Consequently, 500 mA of electric current flows to the image exposure unit 10K for black, which thus consumes 3.125 W of power, but only 20 mA of electric current flows to each of the image exposure units 10M, 10C and 10Y, which thus consume only 0.125 W of power each. Hence, during monochrome image recording by the printer device 1 in standby status, the total power consumed by the four image exposure units is 3.5 W (3.125 W+0.125 W×3), so 9 W (12.5 W−3.5 W) of power can be saved compared to the color mode.

Next, as shown in FIG. 4, when the designation of sleep mode is canceled (ST7; YES), the head control unit 46 executes a sleep mode cancellation process for the image exposure unit 10K for monochrome (ST8). Next, the head control unit 46 after reading out the light amount correction data from the EEPROM 51K of the image exposure unit 10K, executes the transfer process explained with reference to FIG. 5 wherein the read-out light amount correction data is transferred to the light amount correction value setting unit 60 of the image exposure unit 10K (ST9). As shown in FIG. 9, cancellation of sleep mode is executed by the head control unit 46 outputting to the image exposure unit 10K the 51$^{st}$ strobe signal after the image exposure unit 10K has entered sleep mode. In addition, the electric current values shown in this figure indicate the magnitude of the electric current supplied to the image exposure unit 10K, as shown in FIG. 10.

Next, the MPU 52 determines whether or not the printer device 1 is in color mode (ST10), and when the determination is that the printer device 1 is not in color mode (ST10; NO), a determination is made as to whether or not the host equipment or the like has commanded the mode be switched (ST13). When the determination here is that mode switching has not been commanded (ST13; NO), the MPU 52 again waits for the input of print data with the printer device 1 set to monochrome mode.

On the other hand, when the determination is that mode switching has been commanded (ST13; YES), the MPU 52 should switch the printer device 1 to color mode and causes the conveyor path of the intermediate transfer belt 14 to move to color position (ST16). In this case, the head control unit 46 controlled by the MPU 52 causes the intermediate transfer belt 14 to move from the above-described position shown in FIG. 8 to the position shown in FIG. 2, and cancels the sleep mode of the image exposure units 10M, 10C and 10Y (ST11). In addition, the head control unit 46 reads out light amount correction data from the EEPROMs 51M, 51C and 51Y corresponding to the image exposure units 10M, 10C and 10Y, and transfers the light amount correction data to the light amount correction value setting unit 60 of each image exposure unit 10M, 10C and 10Y (ST12). This light amount correction data transfer process is performed while the above-described mechanical conveyor path movement process of the intermediate transfer belt 14 is being executed, so no special time is needed for the execution.

Following this, the head control unit 46 waits for the input of color print data and when the print data is input accomplishes the color image print process. FIG. 11 is a timing chart showing one example of the transfer timing of the color print data (image data). While the head control unit 46 is outputting a vertical synchronization signal (VSYNC) and also outputting a horizontal synchronization signal (HSYNC), the image data (DATA0 to DATA3) are supplied to the image exposure units 10M, 10C, 10Y and 10K, respectively in synchronous with the clock signal (VCLK). With the image data supplied, the image exposure units 10M, 10C, 10Y and 10K emit light from the above-described LED1 to LED7680, respectively, and the image forming units 6M, 6C, 6Y and 6K possessing the photosensitive drums 7 illuminated by light accomplish the printing processes thereafter.

In this case, when the determination is that a mode switch has again been commanded (ST13; YES), as shown in FIG. 4, this switch command is a command to switch from color mode to monochrome mode, so the MPU 52 executes the movement control process that causes the intermediate transfer belt 14 to move to the monochrome position (ST14) and the image exposure units 10M, 10C and 10Y are caused to transition to sleep mode (ST15). Furthermore, as described above, the printer device 1 achieves a state in which image recording is accomplished in monochrome mode, and for example when print data is input, the image data is transferred to the image exposure units 10K with the timing shown in above-described FIG. 11, and the subsequent monochrome printing process is accomplished.

As discussed above, with the present embodiment, in monochrome mode 10M, 10C and 10Y, which comprise the color image recording unit, are set to low power consumption mode, so it is possible to reduce power consumption in the image exposure units during this time.

In addition, during this time the more the monochrome image printing is repeated and the longer this status extends, to 60 minutes, 90 minutes, 120 minutes and so forth, the more the power consumption of the printer device 1 can be reduced.

In the above-described embodiment, the image forming device was described using a printer device as an example, but this can be applied to other image forming devices such as copy machines and the like. In addition, the transition time to sleep mode was described as 30 minutes, but this time is intended to be illustrative and not limiting.

In addition, in the above-described embodiment a method in which the power supply to all circuits possessed by the image exposure units 10 was halted was explained as the sleep mode method, but it would be fine to maintain a status in which a small amount of power is supplied to activate a portion of the circuits.

Furthermore, the sleep mode switch of the image exposure units may be a method of supplying electric power to only the image exposure units of the necessary colors in accordance with the recording colors contained in the recording data and to switch to sleep mode for the image exposure units for all colors that are not necessary to recording.

Having described and illustrated the principles of this application by reference to one (or more) preferred embodiment(s), it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. An image forming device comprising:
   a monochrome image recording unit for driving a monochrome image exposure unit based on monochrome image data and for performing a monochrome recording process on a record medium;
   a color image recording unit for driving a color image exposure unit based on color image data and for performing a color recording process on a record medium, wherein each of said monochrome image recording unit and said color image recording unit is settable to a low power consumption mode;
   a switching unit for switching between monochrome image recording and color image recording; and
   a control unit for initially setting both of the monochrome image recording unit and the color image recording unit to the low power consumption mode when and for, upon a monochrome image recording, cancelling the low power consumption mode of the monochrome image recording unit while continuing to set the color image recording unit to the low power consumption mode.

2. The image forming device according to claim 1, wherein light amount correction data is written to the image exposure unit of the monochrome image recording unit during the monochrome image recording.

3. The image forming device according to claim 2, wherein the light amount correction data is read out from a non-volatile memory provided in the monochrome image recording unit.

4. The image forming device according to claim 2, wherein the light amount correction data is read out from a non-volatile memory provided in the image forming device.

5. The image forming device according to claim 2, wherein the switching unit also controls a switching operation that displaces a conveyor path of an intermediate transfer belt that conveys a toner image between a time of the color image recording process and a time of the monochrome image recording process.

6. The image forming device according to claim 1, wherein the switching unit also controls a switching operation that displaces a conveyor path of an intermediate transfer belt that conveys a toner image between a time of the color image recording process and a time of the monochrome image recording process.

7. A power consumption control method for an image forming device having a monochrome image recording unit and a color image recording unit, said image forming device being capable of setting each of said monochrome image recording unit and said color image recording unit to a low power consumption mode, and said power consumption control method comprising:
   a switching process that switches between monochrome image recording and color image recording; and
   a control process that initially sets both of the monochrome image recording unit and the color image recording unit to the low power consumption mode and that, upon a monochrome image recording, cancels the low power consumption mode of the monochrome image recording unit, while continuing to set the color image recording unit to the low power consumption mode.

8. An image forming device for recording an image on a record medium based on a plurality of image data corresponding to a plurality of basic recording colors, the image forming device comprising:
   a plurality of image exposure units corresponding to the plurality of the basic recording colors, wherein only one of the plurality of image exposure units is used to record a monochrome image on the record medium and at least two of the plurality of image exposure units are used to record a color image on the record medium;
   a power supply unit for supplying electrical power to each of the plurality of image exposure units; and
   an image data identification unit for identifying each of said plurality of image data corresponding to each of the plurality of basic recording colors from input image information;
   wherein the power supply unit initially supplies a lower electrical power to all of the plurality of image exposure units when a low power consumption mode is designated, and, upon cancellation of the low power consumption mode and a subsequent selection of a monochrome image recording, supplies a predetermined electrical power to said only one of the plurality of image exposure units while continuing to supply the lower electrical power to the rest of the plurality of image exposure units.

9. The image forming device according to claim 8, wherein the basic recording colors comprise colors based on subtractive mixture colors, said subtractive mixture colors including yellow, magenta, cyan, and black, and wherein black is the monochrome recording color.

10. The image forming device according to claim 9, wherein the image data identification unit identifies whether the input image information contains only one of said plurality of basic recording colors or at least two of said plurality of basic recording colors.

11. The image forming device according to claim 10, wherein when the low power consumption mode is canceled and thereafter the color image recording is designated, the power supply unit supplies the predetermined electrical power to said rest of the plurality of image exposure units.

12. A power consumption control method for an image forming device for recording an image on a record medium based on a plurality of image data corresponding to a plurality of basic recording colors, the image forming device comprising a plurality of image exposure units corresponding to the plurality of basic recording colors, wherein only one of the plurality of image exposure units is used to record a monochrome image on the record medium and at least two of the plurality of image exposure units are used to record a color image on the record medium, the method comprising:

a power supply process for supplying electrical power to each of the plurality of image exposure units; and an image data identification process for identifying each of said plurality of image data corresponding to each of the plurality of basic recording colors from input image information;

wherein in the power supply process, a lower electrical power is initially supplied to all of the plurality of image exposure units when a lower power consumption mode is designated, and when the lower power consumption mode is cancelled and then monochrome image recording is subsequently designated, a predetermined electrical power is supplied to said only one of the plurality of image exposure units, while the lower electrical power is continuously supplied to the rest of the plurality of image exposure units.

* * * * *